July 14, 1931.  R. W. BOND  1,814,663
TOTALIZING COUNTER MECHANISM FOR DISPENSING PUMPS
Filed Jan. 25, 1929  11 Sheets-Sheet 2

Fig. 3.

Inventor:
Raymond W. Bond
By Chas. M. Niasen.
Atty.

Fig. 4.

July 14, 1931.  R. W. BOND  1,814,663
TOTALIZING COUNTER MECHANISM FOR DISPENSING PUMPS
Filed Jan. 25, 1929  11 Sheets-Sheet 4

July 14, 1931. R. W. BOND 1,814,663
TOTALIZING COUNTER MECHANISM FOR DISPENSING PUMPS
Filed Jan. 25, 1929 11 Sheets-Sheet 6

Fig. 10.

Inventor:
Raymond W. Bond
By Chas. M. Niasen
Atty.

July 14, 1931.  R. W. BOND  1,814,663
TOTALIZING COUNTER MECHANISM FOR DISPENSING PUMPS
Filed Jan. 25, 1929   11 Sheets-Sheet 10

Patented July 14, 1931

1,814,663

UNITED STATES PATENT OFFICE

RAYMOND W. BOND, OF FORT WAYNE, INDIANA, ASSIGNOR TO S. F. BOWSER & COMPANY, INC., OF FORT WAYNE, INDIANA, A CORPORATION OF INDIANA

TOTALIZING COUNTER-MECHANISM FOR DISPENSING PUMPS

Application filed January 25, 1929. Serial No. 334,981.

My invention relates to totalizing counter-mechanism for dispensing pumps, particularly of the visible type, although it may have a general application, and one of its objects is the provision of improved and efficient mechanism for registering the total number of gallons of liquid dispensed accurately.

Another object of the invention is the provision of means for easily adapting totalizing counter-mechanism to various capacities of visible bowls or other containers of dispensing pumps to which it may be desired to connect such totalizing counter-mechanism.

A further object of the invention is the provision of simple and efficient means for setting the mechanism to register each of the different quantities dispensed with means for securely holding the same in each of such positions.

A further object of the invention is the provision of improved and efficient means for operating quantity registering mechanism in conection with the operation of the discharge valve so that complete registration will be made before the discharge valve is opened, thereby preventing fraud in the dispensing of the gasoline from the dispensing unit.

Another object of the invention is the provision of improved means operable at each successive time that the discharge valve is opened or moved from neutral position to discharge position to cause the quantity counting-mechanism to repeat the registration of the number of gallons dispensed.

A further object of the invention is the provision of improved mechanism associated with the discharge valve shaft so that one pertion which controls the amount registered is set and operated separately and independently of the other portion which is actuated by the discharge valve shaft and effects the registration of the number of gallons for which the mechanism has been set.

A further object of the invention is the provision of improved mechanism for preventing adjustment of the quantity stops from changing the amount registered by quantity counter-mechanism.

Another object of the invention is the provision of improved means for controlling the amount to be registered by quantity counter-mechanism comprising mechanism connected to and operated by a sliding tube of liquid dispensing apparatus, which sliding tube in turn constitutes means for controlling the amount of liquid dispensed.

Another object of the invention is the provision of mechanism associated with an overflow pipe of dispensing apparatus for setting the quantity counter-mechanism in accordance with the control of the liquid dispensed effected by the setting of the overflow pipe.

Another object of the invention is the provision of improved means for preventing the totalizing counter-mechanism from being read and the total amount of liquid dispensed over a period of time being known, except by authorized persons.

Other objects of the invention will appear hereinafter, the novel features and combinations being set forth in the appended claims.

In the accompanying drawings—

Figures 1, 2:
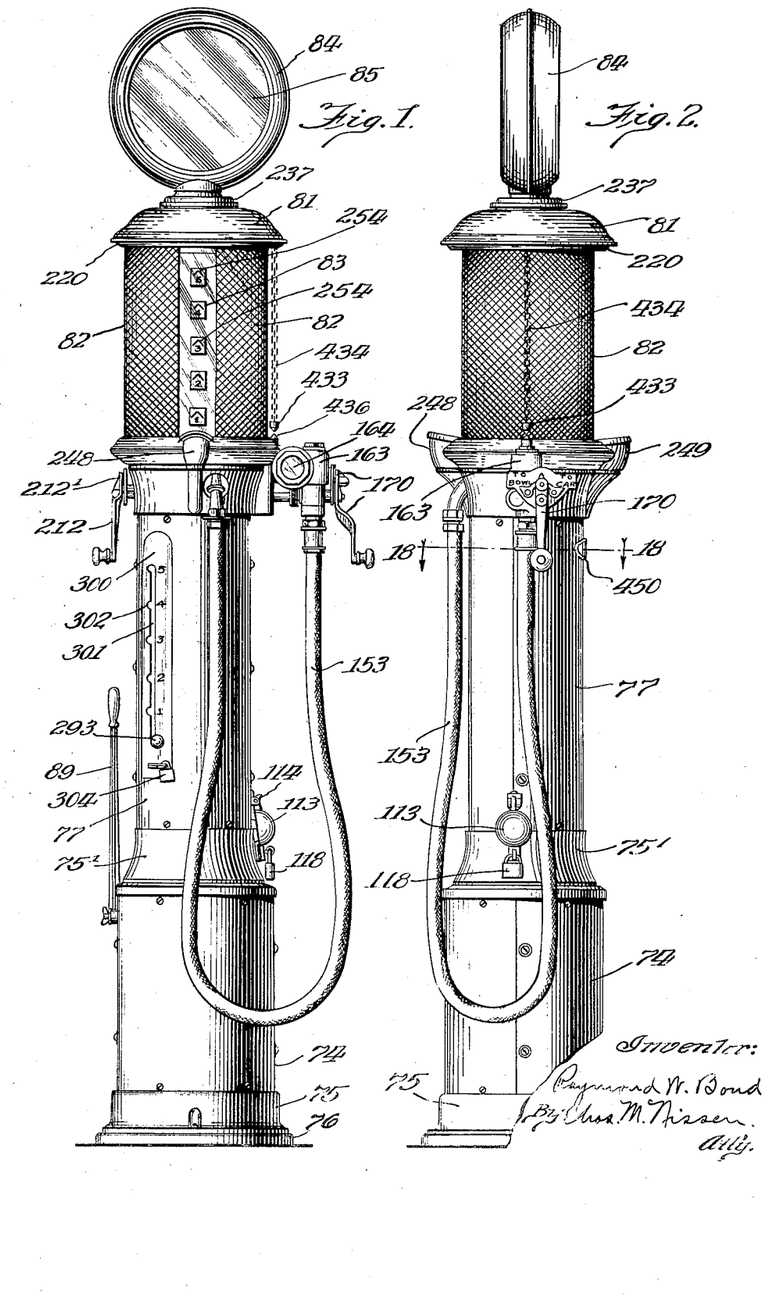
Figs. 1 and 2 are elevational views of visible dispensing units embodying my invention.

In the accompanying drawings, Figs. 1 and 2 represent elevational views of the entire dispensing unit which is adapted to be mounted in fixed and permanent position at the place of use such as at a filling station.

In my co-pending application, Serial No. 326,659, filed December 17, 1928, for an improvement in dispensing apparatus of the visible type, I have shown and described a similar dispensing unit and have claimed therein the various novel features embodied in the structure, and in particular the interlocking mechanism for compelling certain predetermined sequence in the filling and dispensing operations, whereas in the present application I wish to emphasize the mechanism for operating the totalizing counter-mechanism in co-operation with the various features of the entire dispensing unit.

The filling of the visible bowl or container 80 will also fill the chamber 157 and this filling operation preparatory to dispensing gasoline to a customer will be indicated by the float 166 rising on the post 167 between the sight-glass windows 164.

Figures 7, 8, 9:
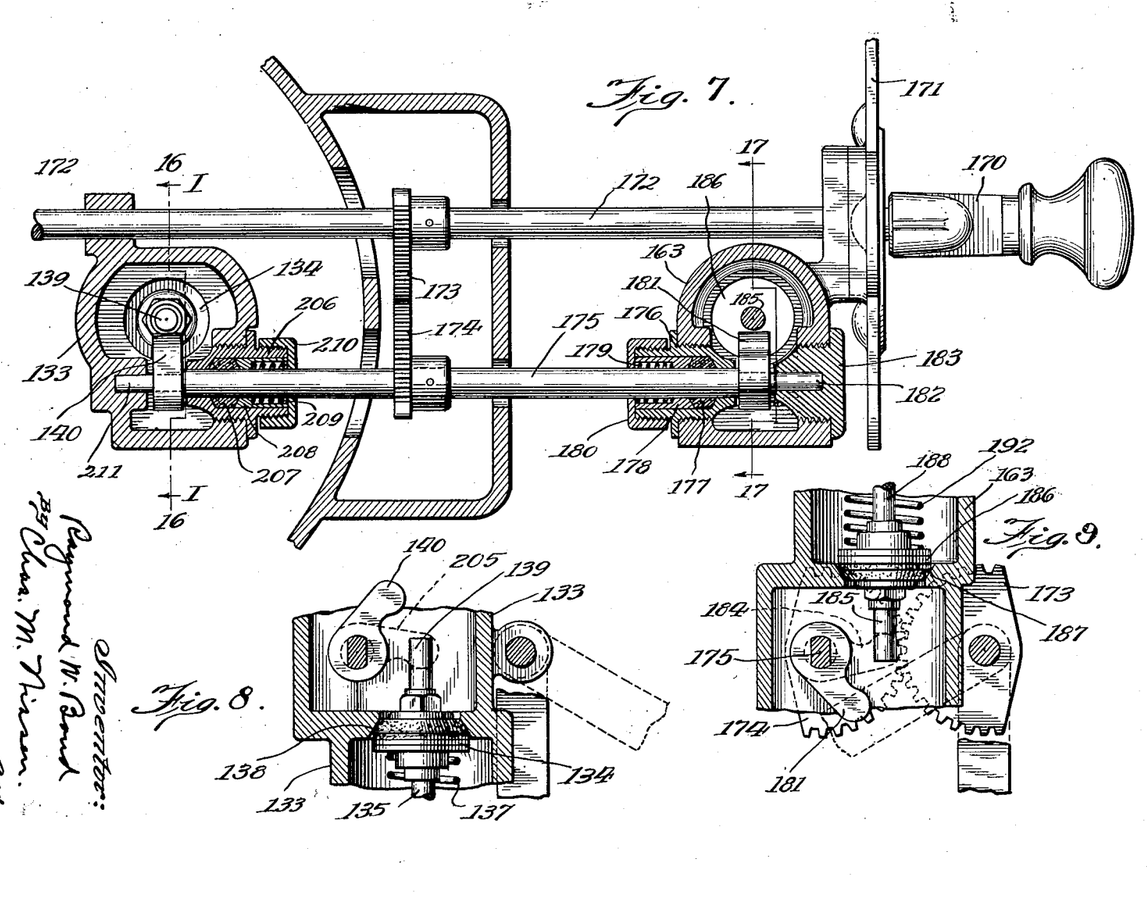
Fig. 7 is an enlarged sectional plan view of the filling valve and the discharge valve and the mechanism for operating the same.
Fig. 8 is a sectional elevation on the line 16—16 of Fig. 7, looking in the direction of the arrows and showing the filling valve.
Fig. 9 is a sectional elevation of the discharge valve taken on the line 17—17 of Fig. 7, looking in the direction of the arrows.
Figure 15:
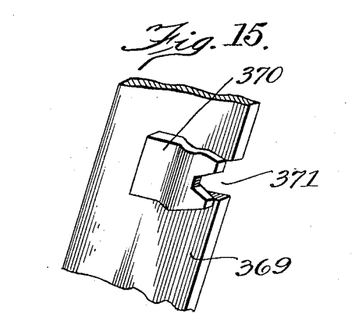
Fig. 15 is a perspective view of one side of the mutilated rack bar for setting the totalizing counter-mechanism in accordance with the position of the overflow tube of the dispensing apparatus.

When the operator swings the controlling lever 170 in a clockwise direction he will rotate the shaft 172 shown in Fig. 7 and thereby rotate the segmental gear 173 which is fixed to this shaft. The segmental gear 173 meshes with another segmental gear 174 which is secured to the shaft 175. The shaft 175 extends through a stuffing-box 176 which is screw-threaded into an opening in the casing 163. The packing 177 in the stuffing-box 176 is held in place by the packing gland 178 and the spring 179. A screw-threaded cap 180 surrounds the shaft 175 and holds the spring 179 in place when screwed onto the stuffing-box 176. A tappet 181 is secured to a reduced portion of the shaft 175; the reduced portion 182 being journaled in the recess in the screw-threaded cap bearing 183 secured to the casing 163, as shown in Fig. 15.

Figure 4:
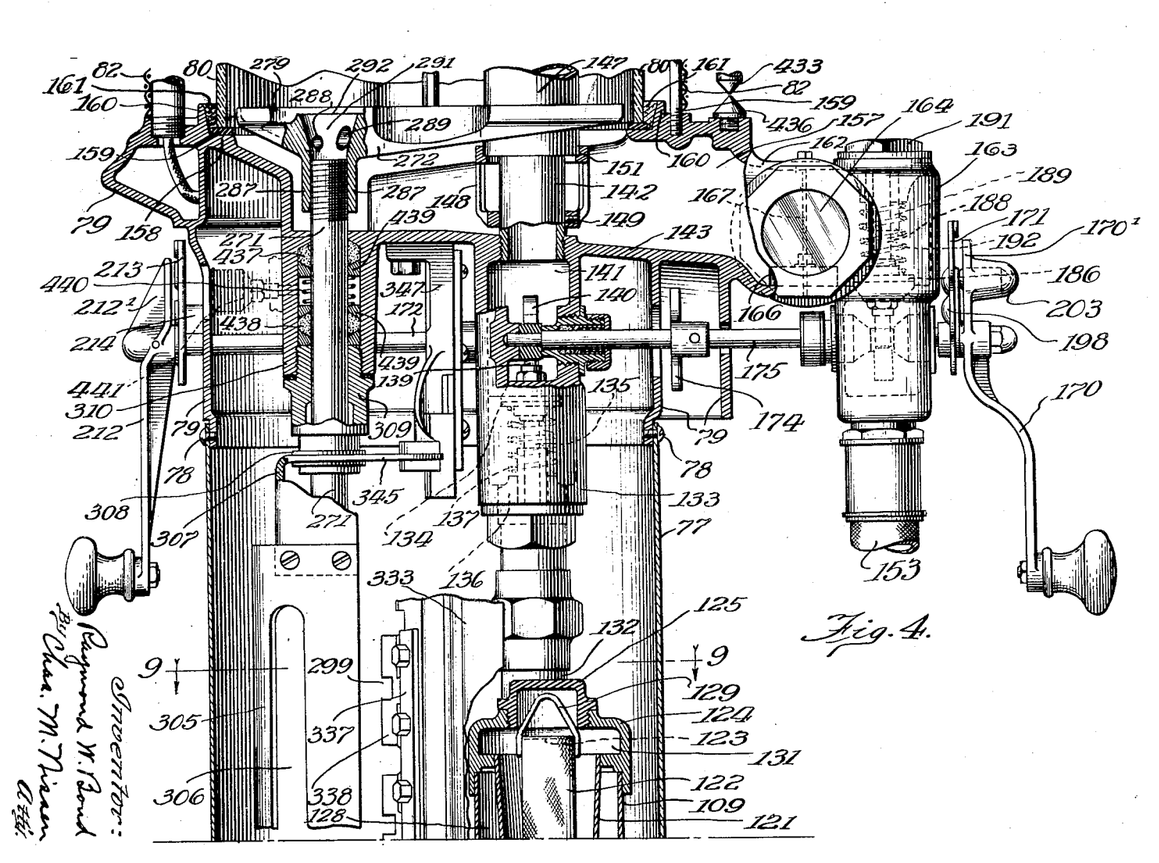
Fig. 4 is a sectional elevation of that portion of the dispensing unit comprising the manifold and the parts connected thereto.

Therefore when the operator moves the controlling lever toward the left or in a clockwise direction along the plate 171, the tappet 181 will be moved to its dotted line position 184 shown in Fig. 9 to engage the lower end of the valve stem 185 of the discharge valve 186 which when closed rests against the seat 187 as shown in Figs. 4 and 9. The upper valve stem 188 is guided in the bearing 189, as shown in Fig. 4. A spring 192 is located between the removable cap 191 and the top of the valve 186. By means of this spring the valve seat 187 may be machined through the opening in the top of the casing 163 and then the valve 186 together with its lower stem 185 and upper stem 188 may be assembled readily by inserting the same through the opening in the upper part of the casing 163; then placing the spring 192 in place and fitting the guide 189 over the stem 188 and securing the assembled structure in place by means of the cap 191.

It will be seen by referring to Figs. 7, 8 and 9 that when the operating lever 170 is moved in one direction the shaft 175 will be rocked so as to move the tappet 181 upwardly to its dotted line position 184, as shown in Fig. 9, and that when the operating lever 170 is moved in the opposite direction the shaft 175 will be rocked so as to move the tappet 140 downwardly to the dotted line position shown in Fig. 8. The tappets 181 and 140 although secured to the same shaft 175 are so arranged that the tappet 181 will operate under the discharge valve 186 and the tappet 140 will operate above the filling valve 134. The operating mechanism for the filling valve and the discharge valve is therefore so interconnected that these two valves cannot possibly be opened at the same time. Whenever the filling valve is opened, the discharge valve will be closed, and whenever the discharge valve is opened, the filling valve will be closed, by reason of the connections between the valves which are in effect interlocking in this respect.

In the same manner that the shaft 175 extends through a stuffing-box into the casing 163, the other end extends through a stuffing-box 206 which is secured to the casing 133. A packing 207 is held in place by the packing gland 208 and the spring 209, which in turn is held in place by the cap 210, as shown at the left-hand portion of Fig. 7. The tappet 140 is mounted on a reduced portion of the shaft 175; the reduced portion 211 is journaled in a bearing in the valve casing 133.

In order that the filling valve and discharge valve may be operated from either side of the dispensing unit, the shaft 172 of Fig. 7 is extended entirely through the manifold 79 to that side of the dispensing unit opposite the discharge valve and is provided with an operating lever 212, as shown in Fig. 4. This operating lever 212 is provided with an upper indicating arm 212′ which moves over the plate 213 secured to the boss 214 on the lower portion of the manifold 79. The indicating plate 213 is similar to the indicating plate 171 and the pointer arm 212′ corresponds to the pointer arm 170′. The pointer arm 170′ may be provided with a boss 203 carrying suitable spring-pressed detent mechanism for co-operating with recesses 198 to hold the operating levers 170 and 212 in certain indicating positions such as "To car" and "To bowl" and also in central or neutral position (Fig. 2). Limit stops may also be provided to limit the movements of the levers 170 and 212 in both directions. The indications "To bowl" and "To car" may also be placed on the plate 213 for co-operation with the pointer arm 212′. These indications are oppositely placed on the plate 213 with respect to the indications on the plate 171 by reason of the fact that the plate 213 is on the opposite side of the dispensing unit. At the same time that the lever 212 will be swung, the lever 170 may also be swung since both levers are rigidly connected to the shaft 172 to swing together with the rocking of this shaft. Therefore the detent mechanism carried by the boss 213 associated with the pointer 170′ will hold both of the operating levers in the positions to which they have been moved.

Figures 5, 6:
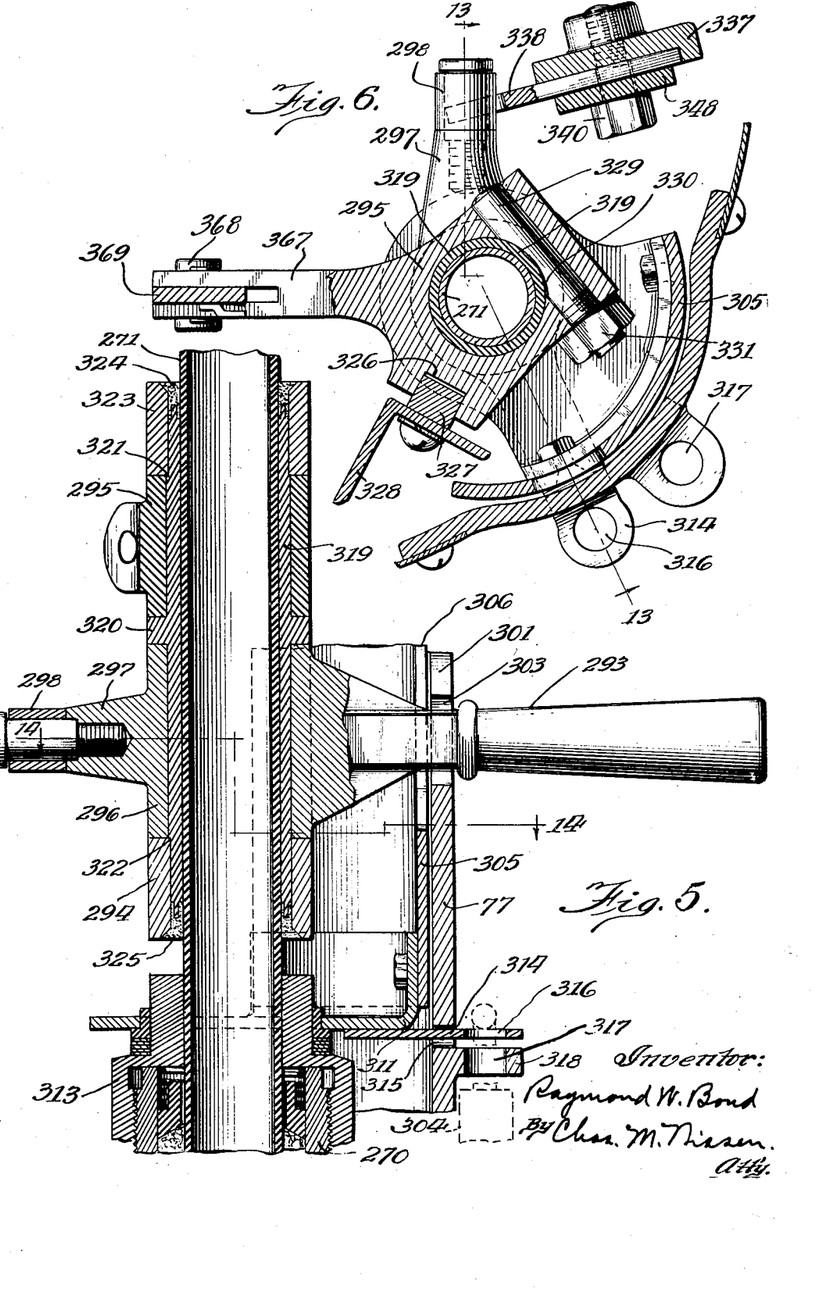
Fig. 5 is an enlarged sectional elevation taken on the line 13—13 of Fig. 6 showing the quantity stop lever mechanism.
Fig. 6 is a sectional plan view on the line 14—14 of Fig. 5.

The quantity stop lever 293, shown in Figs. 1 and 5, is mounted on the overflow tube 271 between the bearings 294 and 320, as shown in Fig. 5, the latter being fixed to the overflow pipe 271 to move bodily up and down therewith while the hub 296 of the quantity stop lever 293 is free to rotate on the bearings 319 and 320 relatively to the tube 271. The hub 296 carries an arm 297 on which is mounted a roller 298 adapted to enter any one of the five quantity stop slots shown at 299 in Fig. 4.

As shown in Fig. 1, an elongated slotted plate 300 is mounted on the exterior of the casing 77. This plate is provided with a vertical slot 301 having at intervals recesses 302 which extend toward the left, as viewed in Fig. 1. At the lower end of the slot 301 is another slot which extends toward the right and when the lever 293 is in this lowermost slot the padlock 304 may be used to lock the lever 293 in its lowermost position and at the same time lock the funnel structure 272 in its position at the bottom of the visible container 80, as shown in Fig. 4.

By referring to Fig. 4 it will be seen that a door 305 having the shape of a segment of a cylinder is provided with an elongated slot 306 through which the quantity stop lever 293 projects and along which it may slide. The upper end of the door 305 is provided with a right-angle bracket arm 307 journaled on a bearing 308 at the lower end of the packing gland member 309, which in turn is supported by the packing box 310, as shown in Fig. 4.

Connected to the lower end of the door 305 is another right-angle bracket arm 311 journaled at 312 to the cap 313 on top of the stuffing-box 270. It will thus be seen that the door 305 is mounted for oscillation on the upright axis of the overflow tube 271.

Figure 13:
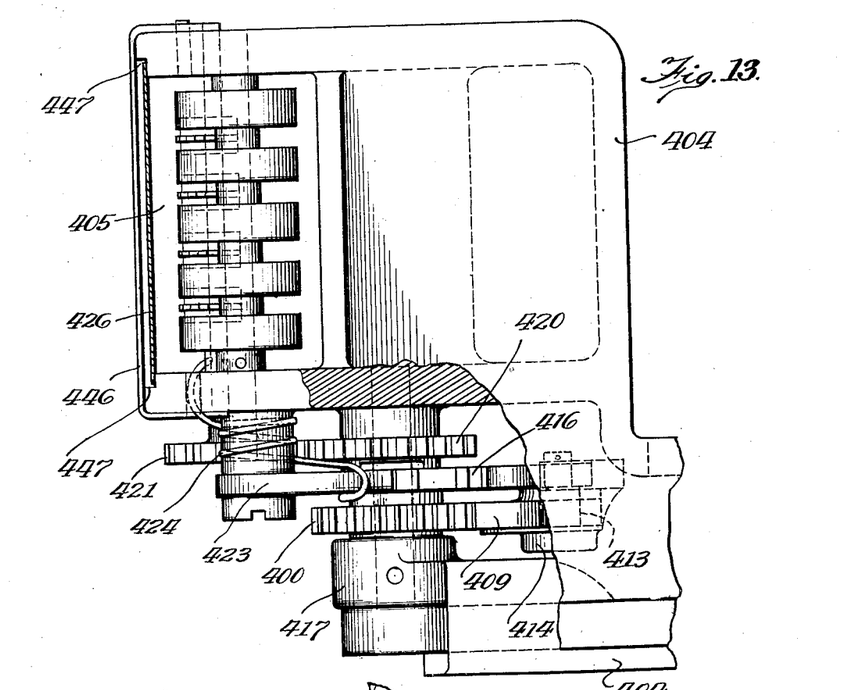
Fig. 13 is a plan view of the totalizing counter and a portion of the mechanism for operating the same.

By referring to Fig. 5 it will be seen that the lower bracket arm 311 has secured thereto a plate 314 which extends to the exterior of the dispensing unit through a slot 315. The outer portion of the plate 314 is provided with a hole 316. When the quantity stop lever 293 is moved along the slot 301 in the plate 320 to its lowermost position and toward the right in the slot 303 as viewed in Fig. 1, the hole 316 will be moved above the hole 317 in a lug 318 which projects from and is integral with the housing 77, as shown in Fig. 5. The padlock 304 may then be applied to the holes 316 and 317 to lock the quantity stop lever 293 in its lowermost position. As shown in Fig. 5, a sleeve 319 is secured to the overflow tube 271 so as to move bodily therewith. This sleeve is provided with a collar 320 intermediate its ends and also with shoulders at 321 and 322. The cylindrical bearings 294 fits against the shoulder 322 and a retaining ring 323 fits against the shoulder 321. When the parts are assembled as shown in Fig. 13, the retaining members 294 and 323 are soldered at 324 and 325 to the sleeve 319 and the exterior of the overflow tube 271. The hub 296 is rotatable on the sleeve 319 between the bearings 294 and 320. By means of this arrangement the quantity stop lever 293 may be oscillated on the axis of the overflow tube 271 and relatively thereto and when the lever 293 is lifted and lowered along the slots 301 and 306 it carries with it the overflow tube 271 and the displacement funnel unit in the visible container or bowl 80.

The vertical guide bar 327 shown in Fig. 6 is therefore mounted in fixed position and extends over a sufficient height to correspond with the vertical movement of the quantity stop lever 293 along the slot 301. This arrangement is for the purpose of keeping the overflow tube 271 and the displacement unit 272 from rotating relatively to the glass cylinder. The displacement unit will therefore always be moved along vertical lines and at its various heights will occupy the same positions relative to the glass cylinder 80.

To facilitate assembly, the hub 295 is provided with a clamping rod 329 which has an arcuate slot 330 fitting over the sleeve 319, as shown in Fig. 6. When the nut 331 is loose on the screw-threaded portion of the locking device 329 the tube 271 may be rotated to enable its upper screw-threaded end as shown in Fig. 4 to be secured to the downwardly extending screw-threaded portion 287 of the displacement unit 272. After the overflow tube 271 has been secured to the displacement unit 272 and the latter has been adjusted to its proper position in the glass cylinder 80, the nut 331 shown in Fig. 6 may be tightened so as to cause the arcuate slot 330 in the locking rod 320 to clamp the hub 295 to the sleeve 319 with the slot 326 in the hub 295 fitting over the guide bar 327. Since the sleeve 319 is soldered to the tube 271, the clamping of the hub 295 to the sleeve 319 will rigidly secure the overflow tube 271 to the hub 295 and prevent the tube 271 from rotating. Therefore the vertical guide bar 327 will maintain the displacement unit in the glass cylinder 80 for movement along vertical lines only.

Secured to the vertical angle iron 333 is an auxiliary vertical support 337 and to this support 337 is secured a series of quantity stop plates 338, as shown in Figs. 4 and 6. These quantity stops are each provided with a slot 299 for receiving the roller 298 on the quantity stop lever 293. Each quantity stop plate 338 is provided with slots and means for holding the plates individually in adjusted positions. After the quantity stop plates 338 have been adjusted to occupy the desired elevations and secured in adjusted positions they may be clamped in such adjusted positions by means of the vertical plate 348.

Secured to the bracket 307, as shown in Fig. 4, is a quadrant interlocking plate 345 which is adapted to move into a slot in the depending bracket 347, the latter being secured to the bottom of the plate 348 of the manifold 79. The quadrant plate 345 by being mounted on the bracket 307 is connected to the quantity stop lever 293 by means of the door 305 so that whenever the quantity stop lever 293 is moved laterally into one of the notches 302 of the plate 300, the quadrant plate 345 is moved clockwise, as viewed in plan. While the quantity stop lever is capable of being moved vertically along the slots 301 and 306, the quadrant plate 345 always remains in the same horizontal plane, being pivoted to the bearing 308 for lateral movement with the quantity stop lever on the axis of the overflow tube 271.

Interlocking mechanism controlled by the transverse operating shaft 172 is associated with the quadrant plate 345 so as to lock the quantity stop lever 293 against lateral movement at certain times to compel the desired predetermined sequence in the operation of the dispensing apparatus. This interlocking mechanism comprises interlocking plates 351 and 353 which co-operate with the quadrant plate 345. The interlocking plates 351 and 353 are mounted to slide vertically and such movements are imparted thereto by the rotation of the transverse shaft 172 which is connected thereto for this purpose. Whenever the shaft 172 is rocked, the plate 351 is moved up or down at certain times and at other times the plate 353 is also moved up or down. When the operating levers 170 and 212 are in their neutral positions after a complete cycle of operations has been effected, the filling valve 134 and the discharge valve 186 are in their closed positions and during such neutral positions of the various parts the quantity stop lever 293 may be moved vertically along the slot 301.

When the quantity stop lever 293 is in its lowermost position and moved into the slot 303 and locked in such slot by the padlock 304, the quadrant plate 345 is interlocked with the plates 351 and 353. Therefore when the padlock 304 locks the quantity stop lever against lateral movement, the quadrant plate 345 prevents up or down movement of either of the plates 351, 353. This in turn locks the transverse shaft 172 and also the operating levers 170 and 212.

The interlocking mechanism is such that the quantity stop lever 293 must be moved along the slot 301 and then toward the left into one of the quantity stop slots 299 before the shaft 172 will be released for operation of the controlling levers 170 and 212. Only after the quantity stop lever has been moved to a quantity stop position can either operating lever 170 or 212 be moved "To bowl" position and when this occurs the plates 351 and 353 will be moved to occupy certain relative positions to lock the quantity stop lever in the quantity stop position in which it has been set. In other words, the quantity stop bar 293 cannot be moved out of a notch 302 and along the slot 301 after the levers 170 and 212 have been moved "To bowl" position as it is then necessary to go "To car" position and return to neutral position before being able to reset the quantity lever 293. That is to say, the levers 170 and 212 must first be thrown "To bowl" position, then to neutral, then "To car" position, and then back to neutral, in the order mentioned before it is possible to reset the quantity bar 293.

The interlocking mechanism above described and shown in the accompanying drawings, particularly in Fig. 4, is described and shown in detail in my co-pending application, Serial No. 326,659, filed December 17, 1928, for an improvement in dispensing apparatus of the visible type, and the foregoing description of this interlocking mechanism is given in the present application to show the relation of the totalizing counter-mechanism therewith as hereinafter more fully explained.

When the displacement funnel unit 272 is set at a predetermined height and the gasoline begins to overflow, the operator may move the operating lever 170 or the operating lever 212 back to neutral position to effect closure of the filling valve 134. When the filling valve 134 is closed by the return of the operating lever back to neutral position, the operation of the interlocking mechanism comprising the plates 351 and 353 is such that the quantity stop lever 293 is still locked in its quantity stop position.

The next step in the operation is the movement by the operator of the operating lever 170 or 212 "To car" position which effects another operation of the interlocking mechanism, but the quantity stop mechanism will still be locked against re-setting.

After the bowl has been filled to the desired level and the predetermined quantity of gasoline delivered, the operating lever 170 or 212 may be moved back to neutral position, whereupon the interlocking mechanism will be restored to its initial position where the quantity stop lever will be freed for movement up or down so as to re-set it for the next operation.

Associated with the quantity stop mechanism and the mechanism for operating the filling and discharge valves is totalizing counter-mechanism which is so arranged as to be set by the quantity stop mechanism and operated by the lever 170 or 212 to effect registration of the quantity of gasoline to be dispensed before the gasoline begins to flow from the visible container to the tank of an automobile. The arrangement is such that after the bowl has been filled to the desired level and the operating lever moved to neutral position and delivery is about to be made to the car by movement of the operating lever from neutral position "To car" position, registration of the amount to be delivered will be made during approximately the first half movement of the operating lever from the neutral position "To car" position.

Figure 11:
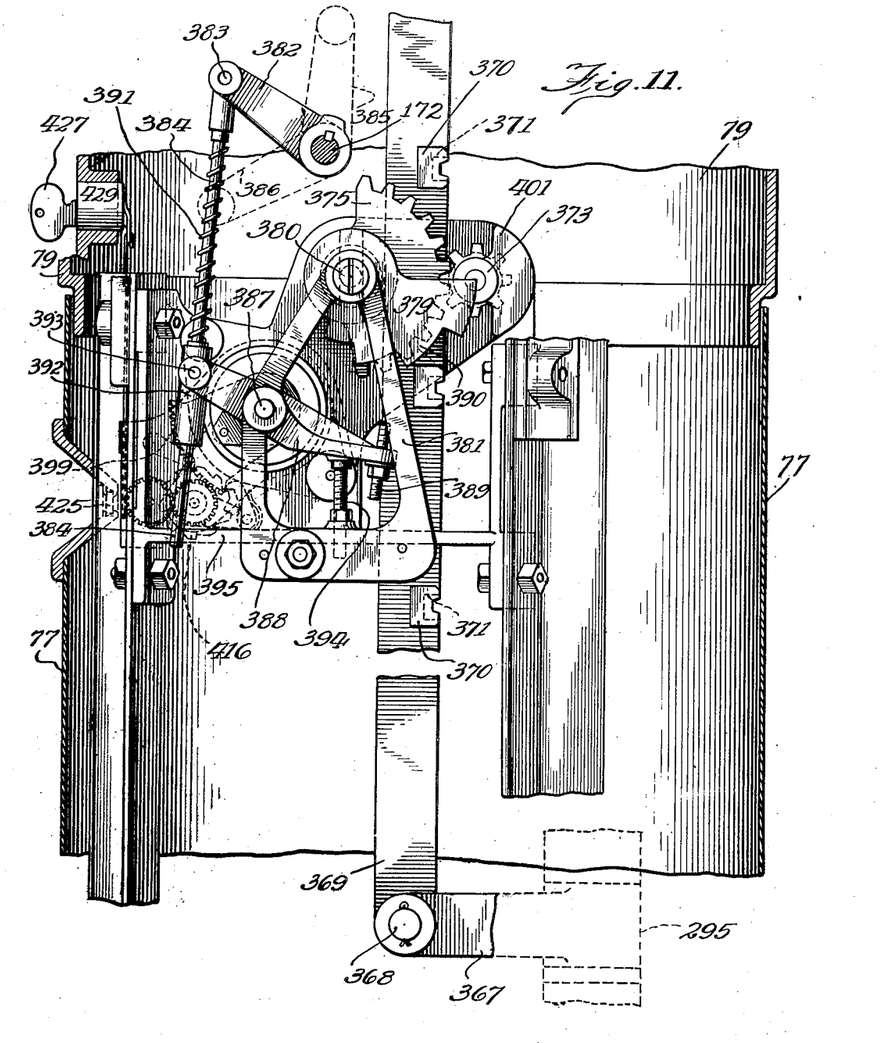
Fig. 11 is an elevational view of the mechanism for operating the totalizing counter.
Figure 16:
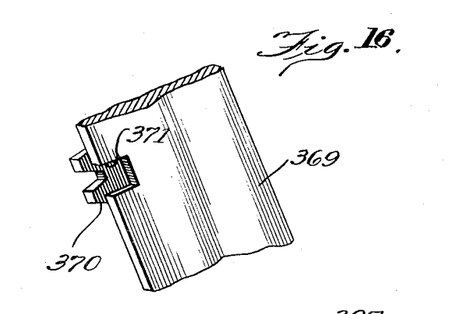
Fig. 16 is a perspective view of the rear portion of the structure shown in Fig. 15.

A radial arm 367 is connected to the hub 295 and to the outer end of this radial arm is pivoted at 368 a vertical bar 369, as shown in Fig. 11. The arm 367 moves along vertical lines as determined by the guide bar 327 shown in Fig. 6. Mounted on the vertical bar 369 are rack gear teeth 370 spaced apart to correspond with the quantity stop notches of the quantity stop mechanism. The gear teeth 370 are shown in elevation in Fig. 11 and in perspective in Figs. 15 and 16 and are mounted in offset position on the vertical bar 369 in registry with the slot 371 therein. When the bar 369 is moved vertically by vertical movement of the quantity stop lever 293 the upper end thereof extends into the tube 278 shown in Figs. 4 and 5. The upper end of the tube 278 is hermetically sealed by the cap 372. Therefore, although the tube 278 extends into the glass cylinder 80, it is entirely closed against the ingress of any liquid since the tube 278 is used only to afford ample space for vertical movement of the mutilated rack bar 369.

Figure 12:
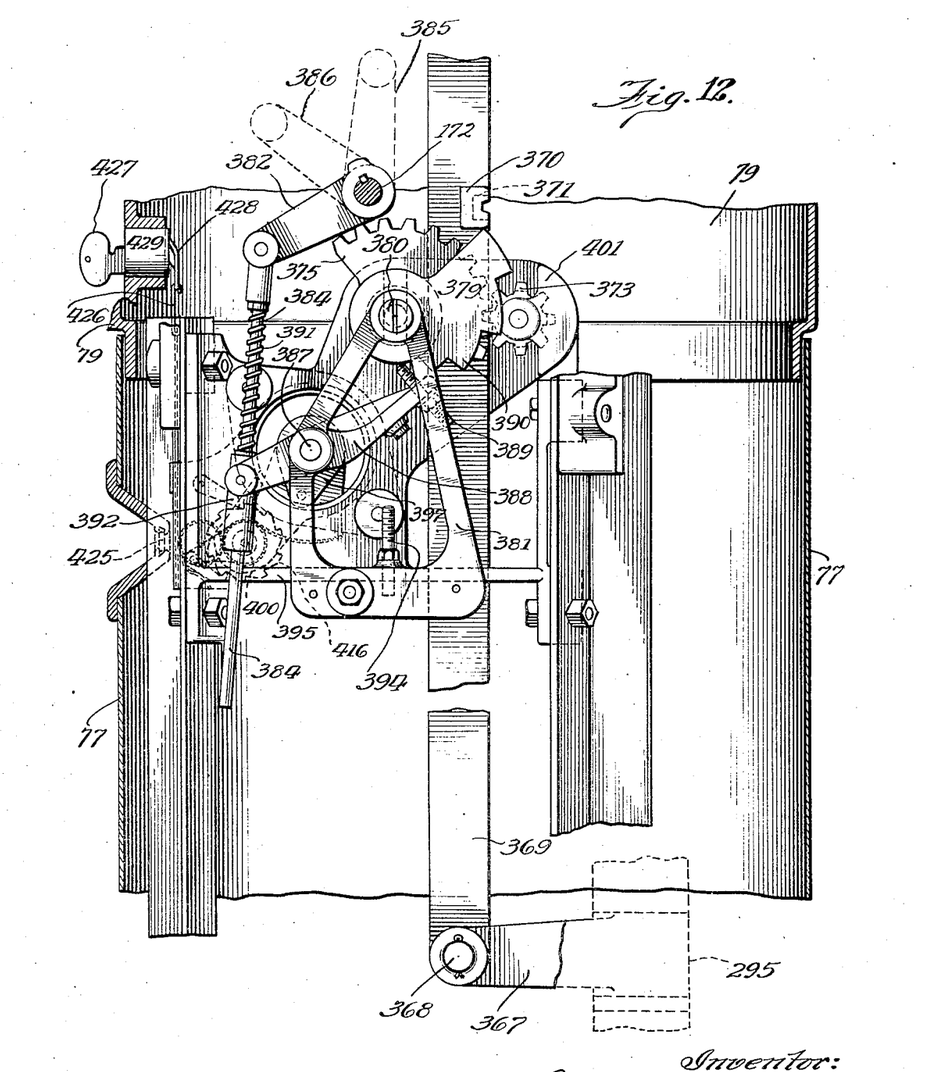
Fig. 12 is a view similar to Fig. 11, but showing the parts in position after having been set to register a predetermined amount to be dispensed.
Figures 17, 18:
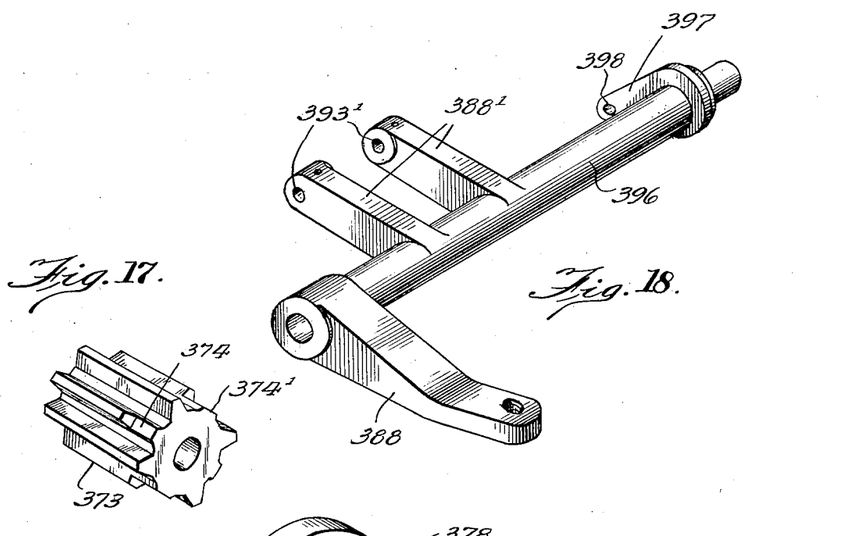
Fig. 17 is a perspective view of a mutilated gear interposed between the mutilated rack bar and the mechanism for setting the mechanism to register the amount to be dispensed on the totalizing counter.
Fig. 18 is a perspective view of one of the operating elements shown in Figs. 11 and 12.

Associated with the rack bar 369 and its spaced-apart teeth 370 and slots 371, is a mutilated gear 373 shown in elevation in Figs. 11 and 12 and in perspective in Fig. 17. This gear 373 has eight teeth, every other one of which is cut away to provide a flat surface 374 which is adapted to be engaged by the right-hand edge of the bar 369 when the gear 373 is between two slots 371. It should be understood that the left-hand portion of the gear shown in Fig. 17 meshes with the segmental gear 375 shown in Figs. 11 and 12, whereas the righ-hand portion of the gear shown in Fig. 17 co-operates with the right-hand edge of the bar 369, the slots 371 and the double-toothed devices 370.

When the bar 369 moves vertically from the position shown in Fig. 11, a flat face 374 is engaged by the right-hand edge of the bar 369 and the adjacent gear teeth 373 engage the bar 369 to lock the gear 373 against rotation. When one of the gear toothed devices 370 is reached, however, the gear 373 will be rotated through an angle represented by two teeth since the full tooth of the gear 373 back of the flat-faced tooth 374 may engage the rack gear 370 while the tooth of the gear 373 to the right of the flat face 374 as viewed in Fig. 17 is free to enter slot 371; then by continued movement of the bar the gear 373 will be turned so that the next flat face 374' will lie between two complete teeth that will engage the right-hand edge of the bar 369.

In this manner the segmental gear 375 will be moved through a predetermined angle, depending on how many of the toothed devices 370 have stepped the gear 373 around, two teeth at a time. It should be particularly understood that the segmental gear 375 meshes with the unmutilated portion of the gear 373 and that the teeth of the gear 373 back of the plane of the gears 370 bear against the right-hand edge of the rack bar 369 to lock the gears 373 and 375 against movement until one of the slots 371 is reached, when the gear 373 is free to rotate two teeth and such rotation will be effected by the double-toothed rack device 370 engaging a full-faced tooth of the gear 373 and then meshing with the gear tooth of the gear 373 between two flat faces thereof.

Figures 20, 21, 22, 23, 24, 25, 26, 27, 28, 29, 30, 31:
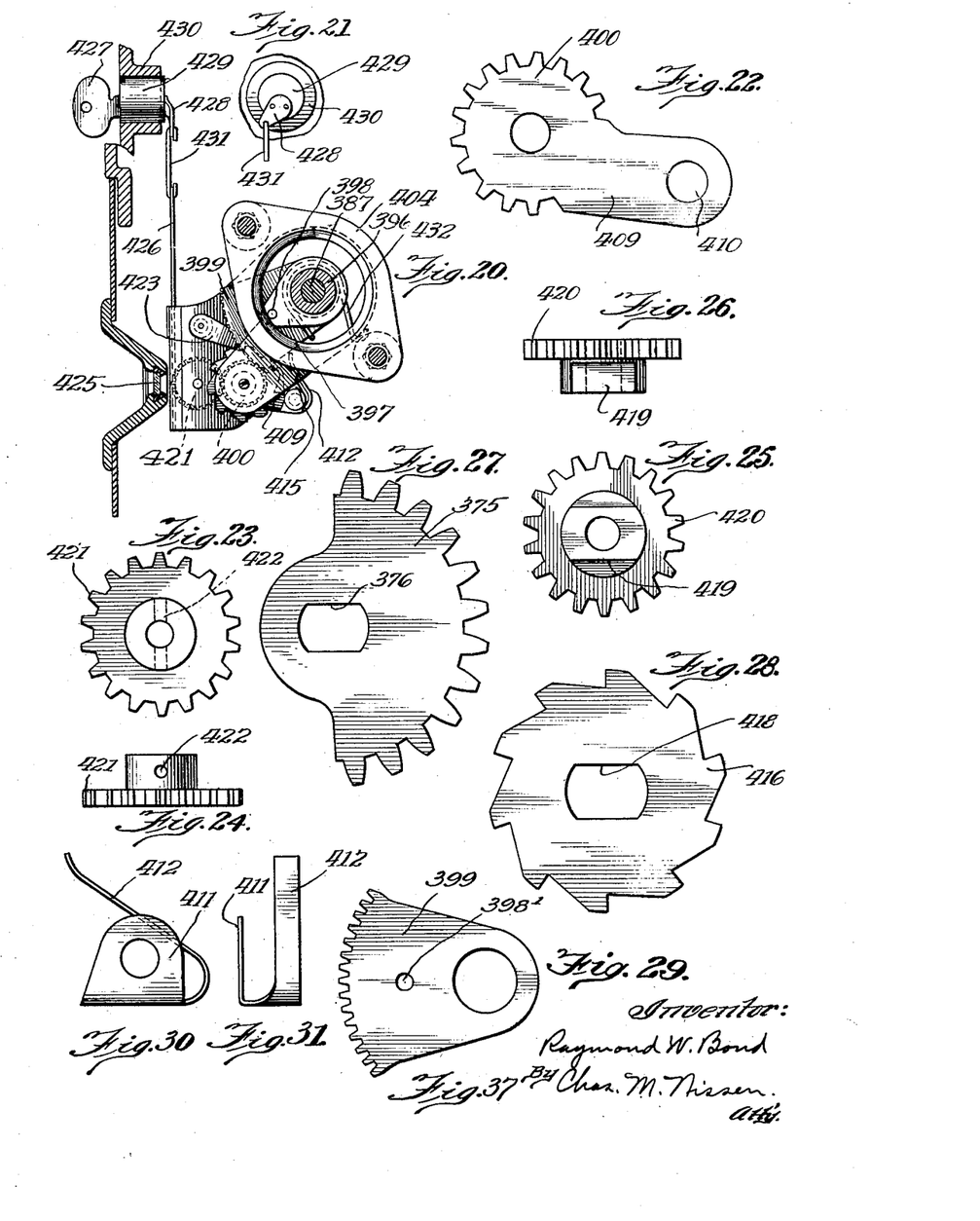
Fig. 20 is a sectional elevation taken on the line 28—28 of Fig. 10 looking in the direction of the arrows.
Fig. 21 is a rear elevation of the upper left-hand portion of Fig. 20.
Fig. 22 is an elevational view of one of the details of Fig. 14.
Fig. 23 is an elevation of another detail of the structure shown in Fig. 14.
Fig. 24 is a plan view of the gear shown in Fig. 23.
Fig. 25 is an elevational view of one of the gears shown in plan in Fig. 13.
Fig. 26 is a plan view of the gear shown in Fig. 25.
Fig. 27 is an elevational view of the segmental gear which meshes with the left-hand portion of the gear shown in Fig. 17.
Fig. 28 is an elevational view of the ratchet wheel shown in Figs. 11, 12, 13 and 14.
Fig. 29 is an elevational view of a segmental gear shown in Figs. 11 and 12.
Fig. 30 is a detail view of the spring for the pawl shown in Fig. 14.
Fig. 31 is an end elevation of the spring shown in Fig. 30.

As shown in Fig. 27, the segmental gear 375 is provided with an opening having opposite flat surfaces 376 which are adapted to fit over corresponding flat faces 377 on the hub 378 of the segmental stop plate 379. The hub 378 is journaled at 380 to the frame 381, as shown in Fig. 11.

On the transverse operating shaft 172, is a crank 382 to which is pivoted at 383 an upright rod 384. When the operating lever 170 or the lever 212 is moved "To bowl" position the crank 382 occupies the position indicated by the dotted lines in Fig. 12. The neutral position of the operating lever 170 corresponds to the full line position of the crank 382 in Fig. 11. When the lever 170 is moved from neutral position "To car" position the crank 382 will be moved to the dotted line position illustrated at 386 in Fig. 11.

The registering mechanism shown in Fig. 11 is so constructed and arranged that during approximately the first half of the movement of the operating lever 170 from its neutral position "To car" position, registration of the quantity delivered may be made so that even before the discharge valve 186 is opened, registration will have been effected. This result is obtained by so arranging the tappet 181 shown in Fig. 7 that it will not engage the stem 185 to open the valve 186 until after the crank 382 has been moved down sufficiently to effect the registration desired.

Figure 19:
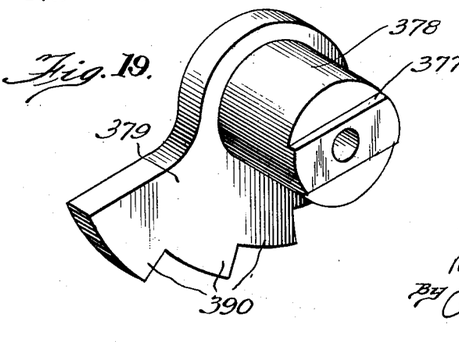
Fig. 19 is a perspective view of the segmental stop plate shown in elevation in Figs. 11 and 12.

Pivoted at 387 to the frame 381 is a double-armed lever 388, the right-hand end of which, as shown in Fig. 11, is provided with an adjustable screw 389 in position to impinge against one of the radial abutments 390, as shown in Figs. 11 and 19.

Movement of the lever 388 is imparted by the spring 391 and the sleeve 392 which is pivoted at 393 to the arm 388 and slides along the rod 384. Therefore while the rod 384 always moves up and down the same distance upon each operation of the crank 384 to its dotted line position 386, the arm 388 will be swung only such distance as is permitted by the radial stops or abutments 390. Fig. 12 when compared with Fig. 11 will show the maximum movement of the arm 388 for registering the delivery of five gallons of gasoline. This is due to the fact that the rack bar 369 has been moved to its uppermost position, as shown in Fig. 12, and such movement has caused the gear 375 to be moved in an anti-clockwise direction to its maximum extent. If four of the upper toothed devices 370 had operated the mutilated gear 373 instead of five, the lever 388 would not have been moved to such a great extent and only four gallons would have been registered. In a similar manner, three gallons, two gallons and one gallon will be registered according to the extent of the upward movement of the rack bar 369.

When the lever 388 is released by movement of the crank 382 to its full line position shown in Fig. 11, the lever 388 will be restored to its initial full line position shown in Fig. 11 and rest in such initial position against the adjustable abutment 394 which is mounted on the stationary frame 395. The lever 388 is shown in perspective in Fig. 18, perforations being shown at 393' in the arm 388' for the pivotal connection to the sleeve 392 at 393, as shown in Fig. 11.

The arm 388 may have integral therewith the sleeve 396 adapted to be journaled on the shaft 387. Cast integral with the sleeve 396 is the radial plate 397 having a perforation therein at 398, as shown in Fig. 18. The radial plate 397 is riveted through the hole 398 to the segmental gear 399, as shown in Fig. 20. The hole shown at 398' in Fig. 29 may be provided in the gear 399 for this purpose. The segmental gear 399 meshes with the segmental gear 400 which is shown in elevation in Fig. 22 and also in Fig. 14.

Figure 10:
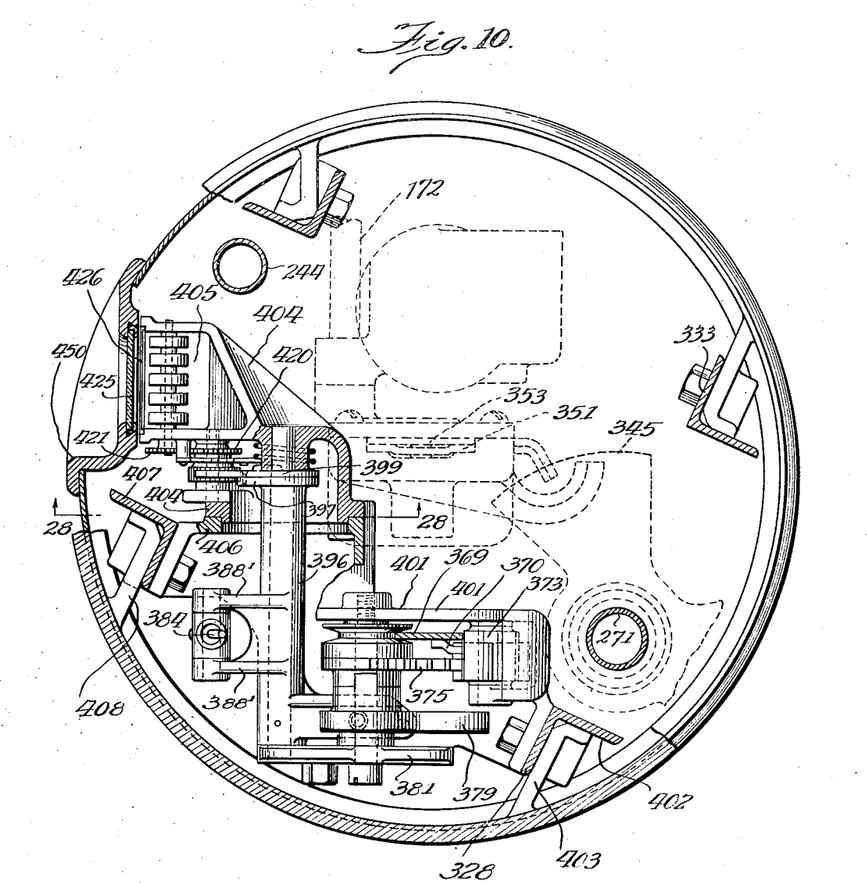
Fig. 10 is a sectional plan view taken on the line 18—18 of Fig. 2.

The frame 401 for supporting the mutilated gear 373 is shown in elevation in Fig. 11 and in plan in Fig. 10. This frame is secured by means of the angle iron 402 to the frame 403 which is mounted on the manifold 79. The frame 404 for supporting the totalizing counter 405 is mounted on the frame 406, the latter being secured by means of angle iron 407 to the frame 408 which is mounted on the manifold 79.

As shown in Fig. 22, the segmental gear 400 is provided with an arm plate 409 perforated at 410. This plate 409 is shown assembled in the elevational view in Fig. 14 and in plan view in Fig. 13.

Figure 14:
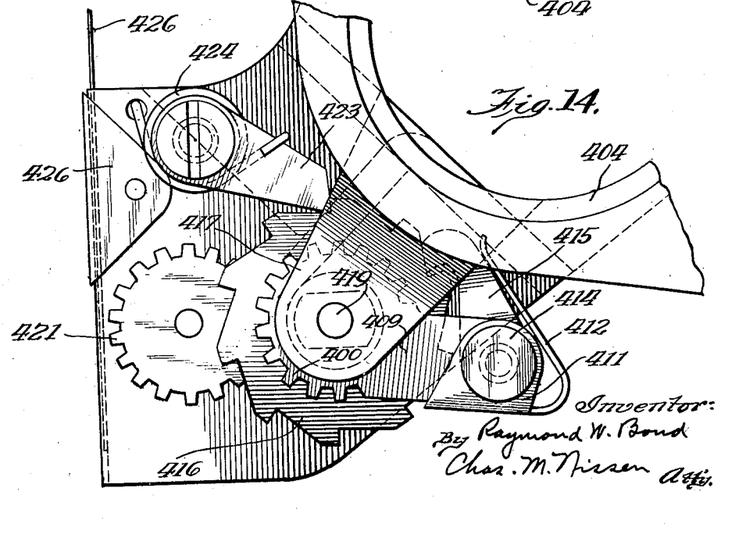
Fig. 14 is an elevational view of the structure shown in Fig. 13.

Mounted on the right-hand end of the plate 409, as shown in Fig. 14, is a plate 411 which is provided with a spring extension 412 shown in elevation in Figs. 14 and 30, and in end view in Fig. 31. The shaft 413 with a large head 414 is mounted on the plate 409 to hold the plate 411 and spring 412 in position and to serve as a journal bearing for the pawl 415. The spring 412 rests against the back of the pawl 415 to hold it in engagement with the ratchet wheel 416, as shown in Fig. 14.

When the arm 388 is moved against one of the radial stops 390 and the segmental gear 399 rotates the gear 400, the arm 409 will be swung down on its pivotal connection with the bracket arm 417 which is secured to the frame 404, as shown in Figs. 13 and 14. The downward movement of the arm 409 will cause the pawl 415 to rotate the ratchet wheel 416 in a clockwise direction. As shown in Fig. 28, the ratchet wheel 416 is provided with an opening having flat faces 418 fitting on corresponding flat faces 419 of the gear wheel 420. This gear wheel meshes with the gear 421 which is pinned to the operating shaft of the totalizing counter-mechanism, provision for such connection being indicated by the perforations 422 in the hub of the gear 421 in Figs. 23 and 24. The totalizing counter-mechanism 405 is of usual and well-known construction, that shown in Figs. 10 and 13 being capable of registering 99,999 gallons of gasoline.

When the operating lever is moved from "To car" position back to neutral position the crank 382 will be moved to its full line position shown in Fig. 11 and thereupon the arm 388 will be moved down against the abutment or adjustable stop 394. This operation will return the segmental gear 399 to initial position and at the same time rotate the arm 409 back to its position shown in full lines in Fig. 14. The ratchet wheel 416 will be held by the pawl 423 against return movement while the pawl 415 snaps over the ratchet teeth. The pawl 423 is held down yieldingly by the spring 424. It should be particularly noted that when the crank 382 is moved from its position shown at 386 in Fig. 11 to its full line position, the arm 388 will be released, but the spring 391 being a compression spring will not move the lever 388 back to its initial position. To effect restoration of the lever 388, a spring 432 is secured at one end of the frame 404, as shown in Fig. 20, and at its other end to the lower edge of the segmental gear plate 399. The spring 432 is relied on to turn the sleeve 396 shown in Fig. 18 in a clockwise direction, the arm 397 being riveted to the segmental gear plate 399 at 398 and the sleeve 396 being integral or rigidly secured to the arm 397. The spring 432 for restoring the lever 388 to its initial position against the stop 394 will also restore the arm 409 to its full line position shown in Fig. 14.

In order to assure the dropping of the pawls 415 and 423 into the desired notches in the ratchet wheel, the stops 389 and 394 are adjusted to secure a slight overthrow of the plate 409 in both directions of its movement. For instance, when the plate 409 is moved down, its limit will be determined by the adjustment of the stop 389 and a slight downward overthrow will insure the dropping of the pawl 423 into one of the notches of the ratchet wheel 416, as shown in Fig. 14. In a similar manner, the upward movement of the arm 429 will be determined by the adjustment of the stop 394 and by securing a slight upward overthrow the pawl 415 will extend beyond one of the ratchets of the ratchet wheel 416, as shown in dotted lines in Fig. 14.

The numbers on the wheels of the totalizing counter-mechanism are located back of a transparent window 425, as shown in Fig. 20. An opaque shutter or curtain 426 is mounted to slide up and down in the frame 404 between the totalizing counter-mechanism and the glass window 425. This shutter or curtain may be lifted by means of a key 427 which is adapted to rotate the cylinder 429 to the inner end of which is connected a lever plate 428. The cylinder 429 is mounted in a housing 430 secured to the manifold 79. The lever plate 428 is connected by a link 431 to the shutter 426. By means of this construction only authorized persons having a key 427 can at any time secure a reading of the totalizing counter-mechanism.

Referring to Figs. 13 and 14 it will be seen that a guide plate 446 may be secured at its ends to the frame 404. The shutter 426 is also guided at its vertical lateral edges along the grooves 447 in the frame 404, as shown in Fig. 13.

Figure 3:
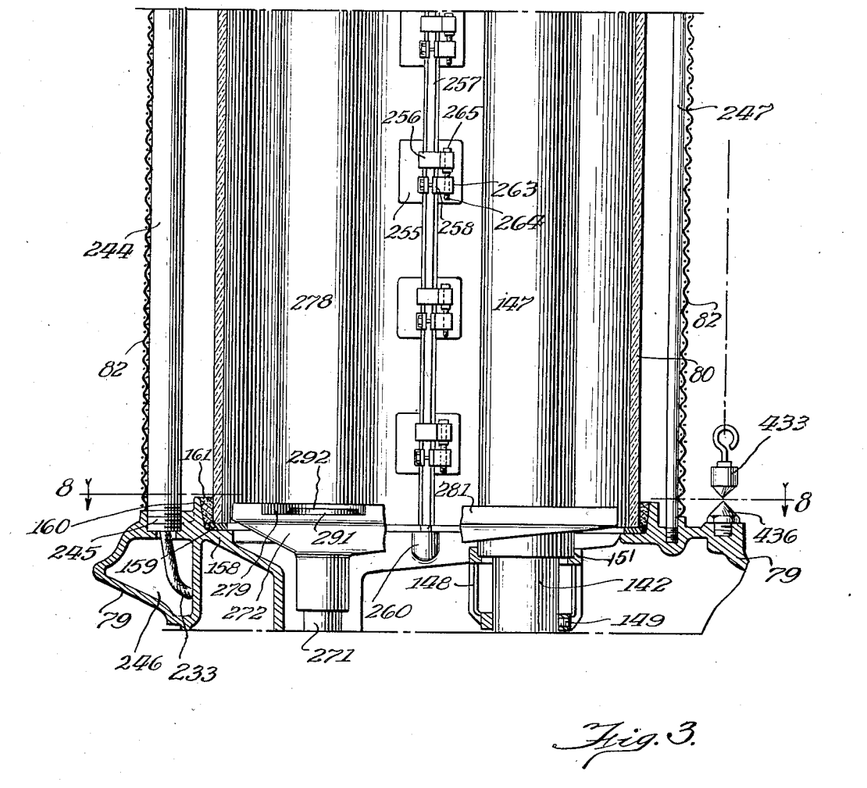
Fig. 3 is a sectional elevation of the lower portion of the visible container and of the manifold on which it is mounted.

In order that the level of the liquid in the visible container may be brought to a horizontal plane, the dispensing unit shown in Fig. 1 may be mounted with the aid of the plumb-bob 433. This plumb-bob is hung from the ring frame 220 by means of a chain 434 attached to the frame 220 at 435. An upwardly extending pointer 436 may be attached to the manifold 79, as shown in Fig. 3, to co-operate with the plumb-bob 433.

In Fig. 4, the packing 437 and 438 in the stuffing-box 310 is held in place by auxiliary packing glands 439 between which is located a spring 440 so as to afford an oil chamber to which is connected an oil cup, as shown by the dotted lines 441 in Fig. 4.

The preferred location of the counter-mechanism is illustrated in Figs. 2 and 10 since Fig. 10 is a plan view on the line 18—18 of Fig. 2, both views showing the frame 450 for the glass window 425 through which a reading of the counter may be made.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In counter-mechanism, the combination with a totalizer, of means for driving the same comprising a double-armed rocking lever, a radially stepped stop plate for limiting the movement of said lever in driving direction, another rocking lever having a predetermined rocking movement, a sleeve pivoted to said first-named lever, a rod pivoted to said second-named lever and slidable through said sleeve, and a spring on said rod between said second-named lever and said sleeve to operate said first-named lever to the extent permitted by said stopplate.

2. The combination with dispensing apparatus having a controlling rock shaft, of a totalizer, means for driving said totalizer comprising a rocking lever, means for adjustably limiting the movement of said lever in accordance with a predetermined quantity of liquid to be delivered by said dispensing apparatus, and an extensible resilient connection between said rock shaft and said rocking lever to actuate the latter to the extent permitted by said limiting means to effect operation of the totalizer to register such predetermined quantity of liquid.

In testimony whereof I have signed my name to this specification on this 21st day of January A. D. 1929.

RAYMOND W. BOND.